United States Patent [19]
Sergi et al.

[11] Patent Number: 5,421,630
[45] Date of Patent: Jun. 6, 1995

[54] COMPACT DISC HANDLING DEVICE

[75] Inventors: Dominic Sergi, R.M.B. 1050, Griffith, NSW 2680; Denis Pompeani, Farm 256, Yoogali, NSW 2680, both of Australia

[73] Assignees: Dominic Sergi; Denis Pompeani; Guiseppe Barbaro, all of New South Wales, Australia

[21] Appl. No.: 190,187

[22] PCT Filed: Aug. 6, 1992

[86] PCT No.: PCT/AU92/00408
§ 371 Date: Apr. 5, 1994
§ 102(e) Date: Apr. 5, 1994

[87] PCT Pub. No.: WO93/03485
PCT Pub. Date: Feb. 18, 1993

[30] Foreign Application Priority Data
Aug. 9, 1991 [AU] Australia .................... PK7670

[51] Int. Cl.⁶ .................... B25B 9/02; B25J 1/02
[52] U.S. Cl. .................... 294/93; 294/99.2
[58] Field of Search .................... 294/6, 16, 27.1, 33, 294/93–97, 99.2, 158, 902; 29/758, 764

[56] References Cited

U.S. PATENT DOCUMENTS

| | | | |
|---|---|---|---|
| 3,019,521 | 2/1962 | Clark | 294/99.2 X |
| 3,588,983 | 6/1971 | Hoy | 294/94 X |
| 4,039,121 | 8/1977 | Crane | 294/93 X |
| 4,595,221 | 6/1986 | de Geus et al. | 294/16 |
| 4,662,667 | 5/1987 | Gilligan et al. | 294/16 |
| 4,726,615 | 2/1988 | Goldberg | 294/16 |
| 4,781,408 | 11/1988 | Hernandez | 294/99.2 |
| 4,877,280 | 10/1989 | Milano | 294/99.2 |
| 5,192,106 | 3/1993 | Kaufman | 294/99.2 |
| 5,195,794 | 3/1993 | Hummel et al. | 294/94 |

FOREIGN PATENT DOCUMENTS

WO91/19291 12/1991 WIPO .

OTHER PUBLICATIONS

"Pick-Up Tools for Rigid Discs", *IBM Technical Disclosure Bulletin*, vol. 28, No. 7, Dec. 1985, p. 3103.

Primary Examiner—Johnny D. Cherry
Attorney, Agent, or Firm—Oliff & Berridge

[57] ABSTRACT

A device for handling a disc such as a compact disc retained in a container by retaining fingers. The device includes first and second arms having free ends and a biasing device to arch the free ends of the arms apart. The free ends include an engaging device having a projecting fin with a thickness for insertion between adjacent retaining fingers of the container.

5 Claims, 1 Drawing Sheet

COMPACT DISC HANDLING DEVICE

The present invention relates to a handling device, more particularly it relates to a device for picking up and manipulating a flat disc having a centrally located opening. It will be convenient to hereinafter refer to the device as in relation to handling a digital audio compact disc or the like, however it should be noted that the invention has a wider application.

Compact discs ("CDs") are well known and widely used to store digital data, particularly digital audio data. In recent times CDs have surpassed analogue vinyl records as the main format of recorded music sold. CDs offer a higher level of fidelity and increased durability compared to vinyl records. However, CDs are still prone to damage.

To ensure CDs are not damaged when not in use, they are usually provided with and stored in a rigid container or case having a recessed portion in which the CD is placed and the disc is held in position on resilient supports upon which the CD is located. The supports extend through and frictionally engage with the edge of an aperture provided centrally in the CD.

These supports are formed by a plurality of resilient plastic fingers arranged radially about a centre point of the recess of the container. Each finger in transverse cross section is shaped to have a head portion and a neck portion such that the diameter of said head portions of the plurality of fingers is slightly larger in diameter of the aperture in the CD and the diameter of the neck portions of the plurality of fingers is approximately equal to the diameter of the central aperture of the CD. Accordingly, when the CD is placed and located about the fingers and pressed towards the base of the recess, the fingers are deformed inwards to allow the aperture to pass the heads of the fingers and once it has passed the head section of each finger and moved towards the neck section, the fingers spring back to their original position and the head sections overhang the aperture thereby holding it in place.

When the user desires to remove the CD from its container, the CD is grasped about its circumferential edge at sides in the container where the edge is exposed for this purpose. Force is then applied to lift the CD out of the container and in doing so deforming the fingers inwardly so that the aperture may pass over the head sections of each finger. Depending upon the shape of the fingers, often considerable force must be applied to the edge to remove the CD. Flexing of the CD is often encountered which, after repeated use, may lead to weakening or even breakage of the CD. Moreover it is often very difficult to obtain a firm grasp on the edge of the CD. Further, once the CD has been removed, the user must take care not to touch the surface of the disc, particularly the playing surface as this may result in depositing of oils, grease and dirt from the fingers of the user and also acids contained in sweat which may etch into the protective coating of the CD. Further scratching of the playing surface may occur. All these undesirable consequences of touching the CD may result in inferior sound reproduction. At all times, the user must be careful to ensure that the CD is not dropped. When removing the CD from the container, particularly when one is applying considerable force to remove it from the retaining fingers, the risk of the CD slipping from the user's fingers and being dropped from the container is high.

Accordingly, there is a need for a device which facilitates easy removal of the CD from its container and allows safe handling of a CD from its container to a CD player.

It is an object of the present invention to provide a solution to one or more of the above problems.

According to the present invention there is provided a device for handling a compact disc having an aperture wherein the device comprises:

a plurality of arms, each arm having engaging means capable of insertion into said aperture between adjacent aperture retaining fingers located on a compact disc container and engageable with a portion of said aperture; and biasing means to urge said plurality of engaging means radially apart, such that when said engaging means are inserted into said aperture and said biasing means urges said engaging means radially apart, said plurality of engaging means co-operate to engage portions of said aperture and retain said compact disc therewith.

Each engaging means may comprise a foot having a recess adapted to provide at least one contact surface to engage a portion of said aperture.

In a preferred embodiment each engaging means comprises a contact surface adapted to engage a portion of the edge of said aperture on the under-side of said compact disc and a retaining shoulder for bearing against a portion of the upper surface of the compact disc adjacent said aperture. When the engaging means are inserted through the aperture and the biasing means urges the engaging means apart, the contact surface presses against the edge of the aperture on the underside of the compact disc and at the same time the retaining shoulder is pressed against a portion of the upper surface of the compact disc adjacent the aperture by virtue of the force exerted by the biasing means. When the plurality of engaging means are engaging portions of the aperture, the contact surfaces cooperate to force the retaining shoulders to bear against the upper side of the compact disc, and thus the disc is securely held between the plurality of contact surfaces and the retaining shoulders.

Preferably, the shape of said feet is such that the contact surfaces are strong enough to apply a significant force to the edge of said aperture if necessary so as to overcome the force of the retaining fingers holding the compact disc in its container. The contact surfaces may be shaped to extend beyond the aperture and bear against the underside of the compact disc adjacent the aperture. In such an arrangement the contact surfaces may be shaped as a tab having an overhanging lip outwardly directed on the foot. In this embodiment the tab is preferably of a size such that it can be inserted between adjacent retaining fingers in the container.

Preferably, there are two laterally opposed arms provided with engaging means. The arms should be of sufficient flexural strength so as to transfer the biasing force to the engaging means when engaging a compact disc.

The biasing means may be any suitable means for urging the engaging means apart laterally. The biasing means may be a resilient member formed integrally with the arms which acts as a pivot between said arms and forces the engaging means apart to a resting position where the engaging means are spaced wider than the diameter of the aperture. If the engaging means are then urged together by force applied by the user and inserted in the aperture and the user's force is then released, the biasing means then forces the engaging means into contact with the side of the aperture and the device is thus secured to the compact disc. In a preferred embodiment, the biasing means is a "U" shaped member formed integrally with said arms and having a plurality of reinforcing members adapted to resist inward deformation of the 'U' shaped member.

The arms may be of any suitable size and shape but preferably are such that they can be readily grasped and manipulated in the fingers of the user. Preferably the arms have a portion which enables the user to apply force to the device to counteract the force of the biasing means so that the engaging means are brought closer together. Said portion may be a broad surface on each arm suitable for being squeezed between the thumb and forefinger of the user.

In a preferred embodiment, engaging means are located on the opposite end of each of said arms to the biasing means. Engaging means may be formed integrally with the arms.

It will now be convenient to describe the invention in more detail with reference to a preferred embodiment illustrated in the accompanying drawings. It is to be understood that the drawings and following description relate to a preferred embodiment only and are not intended to limit the scope of the present invention.

Figure 1:
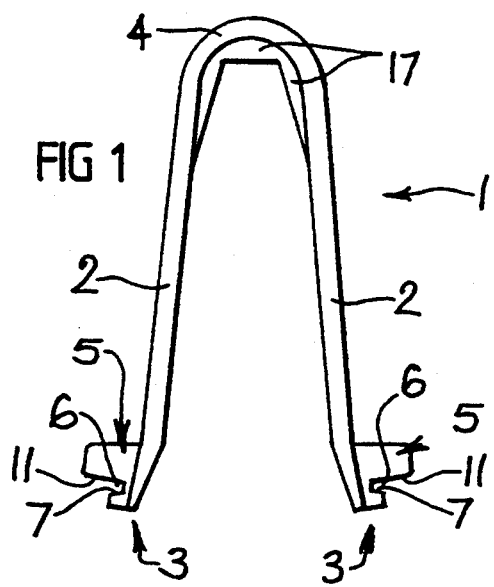
FIG. 1 is a plan view of a device made in accordance with the invention.
Figure 2:
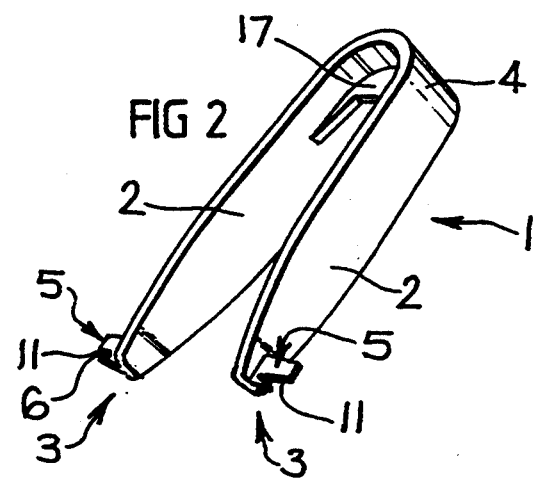
FIG. 2 is a perspective view of a device made in accordance with the invention.
Figure 3:
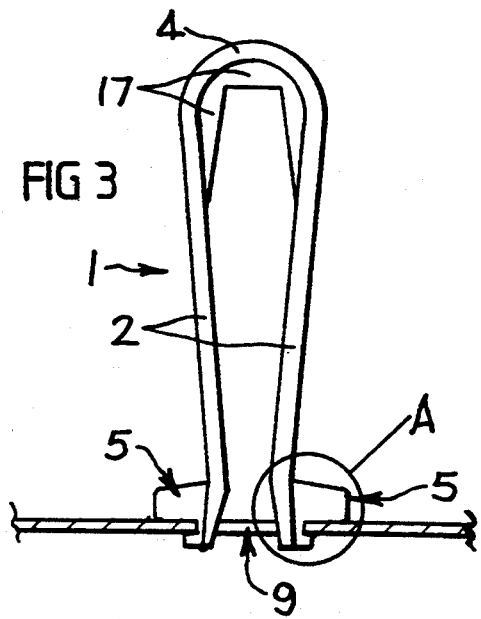
FIG. 3 is a plan view of a device made in accord with the invention shown engaging with a compact disc with the compact disc shown in cross section.
Figure 4:
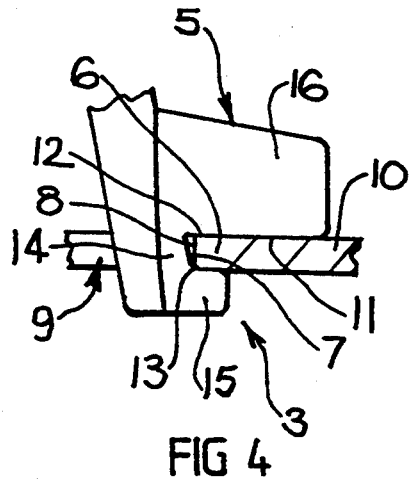
FIG. 4 is an enlarged view of the region marked A in FIG. 3.

Device (1) for handling a compact disc comprises a plurality of arms (2), each arm having engaging means (3) for engaging the edge of an aperture in a compact disc. Device (1) further includes biasing means (4) to urge engaging means (3) laterally apart.

Engaging means (3) may comprise a foot (5) having a recess (6) adapted to provide at least one contact surface (7) to engage the side (8) of said aperture (9) of the compact disc (10). Engaging means (3) may further comprise a retaining shoulder (11) for bearing against a portion of the upper surface (12) of the compact disc adjacent said aperture. In a preferred embodiment contact surface (7) engages a portion of the edge (13) of said aperture on the underside of said compact disc.

Contact surfaces (7) may comprise a tab (14) having an overhanging lip (15) outwardly directed on the foot. Contact surface (7) may thus be capable of applying considerable force to edge (13) without deforming. Tab (14) is preferably capable of being inserted between adjacent retaining fingers of the compact disc container.

Retaining shoulder (11) may include reinforcing member (16). Additionally, a plurality of reinforcing members (17) are adapted to resist inward deformation of the arms (2).

Biasing means (4) may be provided with members (17) to resist movement of engaging means (3) toward each other.

In use, engaging means (3) are spaced apart wider than the diameter of the aperture (9) in the compact disc (10). To engage the compact disc (10), the user applies squeezing force to arms (2) preferably between the thumb and forefinger such that tabs (14) will pass through the aperture. The device (1) is then positioned perpendicular to the plane of the compact disc above the aperture (9) and then inserted such that tabs (14) pass through the aperture until retaining shoulders (11) bear against a portion of the upper surface (12) of the compact disc (10). Tabs (14) must be aligned between retaining fingers of the compact disc container in order that they pass through aperture (9). The user then releases the squeezing force from arms (2) and biasing means (4) forces engaging means (3) apart. Contact surfaces (7) then engage the side (8) of aperture (9) and compact disc (10) is securely retained between contact surfaces (7) and retaining shoulders (11).

To remove the compact disc, the user then simply applies force to the arms (2) or biasing means (4) in the direction perpendicular to the plane of the compact disc container. The force applied must be sufficient to overcome the frictional force applied to the compact disc by the retaining fingers of the container. If considerable force is necessary for removal, overhanging lip portions (15) of tab (14) may engage the underside of compact disc (10) adjacent aperture (9).

Compact disc (10) is then pulled free from retaining fingers of the container.

The user can thus easily manipulate compact disc (10) by holding arms (2) between the thumb and forefinger. Direct contact between the user's fingers and the surfaces of the compact disc is thus avoided.

To release the compact disc once positioned in the compact disc player or returned to the container, the user applies a squeezing force to the arms (2) such that contact surfaces (7) are retracted from the side (8) of aperture (9) and tabs (14) are withdrawn from aperture (9).

The device may be manufactured from any suitable material by any suitable means. Preferably, however, the device is manufactured from a resilient thermoplastic polymer known in the art. Preferably, the device is manufactured by injection moulding or similar suitable method.

It is to be understood that various modifications, additions and/or alterations may be made to the configuration previously described without departing from the spirit of the present invention.

We claim:

1. A device for handling a disc retained in a container, the disc having a substantially flat body and an internal edge defining an aperture in said body, the disc being retained by a plurality of radially spaced retaining fingers contacting the internal edge of said disc, the device comprising:

a first arm having a free end;

a second arm having a free end;

biasing means that urges the free ends of said first arm and said second arm radially apart; and engaging means attached to the free end of each of said first arm and said second arm, the engaging means comprising a fin projecting from each said free end and having a retaining recess, each fin having a thickness for insertion between adjacent retaining fingers, each fin being insertable within said aperture and between adjacent retaining fingers by application of pressure to urge the free ends towards each other and by release of said pressure to allow said retaining recess to be inserted between said adjacent retaining fingers and abut against said internal edge defining said aperture.

2. A device according to claim 1, wherein said retaining recess has a lower contact surface and an upper retaining shoulder, said lower contact surface and said upper retaining shoulder being substantially parallel.

3. A device according to claim 2, wherein said first and second arms are joined remote from said free ends by said biasing means into a U-shaped configuration.

4. A device according to claim 3, wherein said biasing means urges the free ends of said first arm and said second arm radially apart to a position wider than a diameter of the aperture of the disc.

5. A device according to claim 2, wherein said first arm and said second arm are flexible and are formed integrally with said biasing means and said engaging means.

* * * * *